US012461768B2

(12) United States Patent
Van Os

(10) Patent No.: US 12,461,768 B2
(45) Date of Patent: Nov. 4, 2025

(54) CONFIGURING METRIC COLLECTION BASED ON APPLICATION INFORMATION

(71) Applicant: Sysdig, Inc., San Francisco, CA (US)

(72) Inventor: Thomas Van Os, Walnut Creek, CA (US)

(73) Assignee: Sysdig, Inc., San Francisco, CA (US)

( * ) Notice: Subject to any disclaimer, the term of this patent is extended or adjusted under 35 U.S.C. 154(b) by 664 days.

(21) Appl. No.: 17/673,119

(22) Filed: Feb. 16, 2022

(65) Prior Publication Data

US 2023/0259382 A1 Aug. 17, 2023

(51) Int. Cl.

*G06F 9/455* (2018.01)
*G06F 9/445* (2018.01)
*G06F 11/30* (2006.01)

(52) U.S. Cl.

CPC ...... *G06F 9/45558* (2013.01); *G06F 9/44505* (2013.01); *G06F 11/3006* (2013.01); *G06F 2009/4557* (2013.01); *G06F 2009/45591* (2013.01); *G06F 11/302* (2013.01); *G06F 11/3075* (2013.01)

(58) Field of Classification Search

CPC ............. G06F 9/45558; G06F 9/44505; G06F 11/3006; G06F 2009/4557; G06F 2009/45591; G06F 11/302; G06F 11/3075

See application file for complete search history.

(56) References Cited

U.S. PATENT DOCUMENTS

| | | | | |
|---|---|---|---|---|
| 9,117,077 | B2 * | 8/2015 | Mircescu | G06F 21/577 |
| 2013/0145349 | A1 * | 6/2013 | Basak | G06F 11/3495 717/121 |
| 2013/0263209 | A1 * | 10/2013 | Panuganty | H04L 41/5025 709/224 |
| 2016/0294744 | A1 * | 10/2016 | Zou | H04L 51/10 |

(Continued)

FOREIGN PATENT DOCUMENTS

EP 4086771 A1 11/2022

OTHER PUBLICATIONS

C. Cassagnes, L. Trestioreanu, C. Joly and R. State, "The rise of eBPF for non-intrusive performance monitoring," NOMS 2020—2020 IEEE/IFIP Network Operations and Management Symposium, Budapest, Hungary, 2020, pp. 1-7, doi: 10.1109/NOMS47738.2020.9110434. (Year: 2020).*

(Continued)

*Primary Examiner* — Michael W Ayers
(74) *Attorney, Agent, or Firm* — Kim & Stewart LLP

(57) ABSTRACT

A computer-implemented method of monitoring programmatic containers performed through executing an agent processor is disclosed. The method comprises transmitting, by a processor, one or more deployment configurations from a monitoring server related to an application hosted in a container to a backend device, the processor receiving, from the backend device, a plurality of monitoring configurations for the application, the processor merging the plurality of monitoring configurations for the application into a merged (Continued)

monitoring configuration for the application, the processor providing the merged monitoring configuration for the application to the monitoring server, and the processor periodically receiving, from the monitoring server, telemetry data that characterizes one or more instances of the application.

20 Claims, 6 Drawing Sheets

(56) References Cited

U.S. PATENT DOCUMENTS

| | | | | |
|---|---|---|---|---|
| 2017/0288879 | A1* | 10/2017 | Quinlan | H04L 63/0815 |
| 2019/0108049 | A1* | 4/2019 | Singh | G06F 9/5077 |
| 2022/0147381 | A1* | 5/2022 | Gao | G06F 9/45558 |

OTHER PUBLICATIONS

Sysdig.com, "Filtering Prometheus Metrics", https://docs.sysdig.com/en/docs/sysdig-monitor/integrations-for-sysdig-monitor/collect-prometheus-m, retrieved Dec. 12, 2021, 3 pages.

Sysdig.com, "Configure Default Integrations", https://docs.sysdig.com/en/docs/sysdig-monitor/integrations-for-sysdig-monitor/configure-monitoring-integrations/configure-default-integrations/_print/, dated Nov. 29, 2021, 3 pages.

Solanas, David, "How to Monitor Istio, the Kubernetes Service Mesh—Sysdig", https://sysdig.com/blog/monitor-istio/, retrieved Nov. 4, 2021, 18 pages.

MetricFire.com, "How to Deploy Prometheus on Kubernetes", https://www.metricfire.com/blog/how-to-deploy-prometheus-on-kubernetes/, dated Aug. 20, 2019, 22 pages.

De Torres Huerta, David, "No Pain . . . More Gain! Sysdig Monitor Radically Simplifies Monitoring Integrations Based on Open Source", https://sysdig.com/blog/prometheus-monitoring-integrations/, retrieved Nov. 4, 2021, 13 pages.

Burillo, Mateo, "Kubernetes Monitoring with Prometheus, the Ultimate Guide", https://sysdig.com/blog/kubernetes-monitoring-prometheus/, dated Feb. 16, 2021, 15 pages.

International Search Report and Written Opinion mailed Jun. 2, 2023 in International Application No. PCT/US2023/012933 , 11 pages.

* cited by examiner

FIG. 2C

```
global:
  scrape_interval: 20s
scrape_configs:
- job_name: 'default'
  sysdig_sd_configs: # default config
  relabel_configs:
- job_name: 'my-app-job'
  sample_limit: 2000
  sysdig_sd_configs:  # apply this filtering config only to my-app
  -  tags:
       namespace: backend
       deployment: my-app
  metric_relabel_configs:
  # Drop all metrics starting with http_
  - source_labels: [__name__]
    regex: "http_(.+)"
    action: drop
  metric_relabel_configs:
  # Drop all metrics for which the city label equals atlantis
  - source_labels: [city]
    regex: "atlantis"
    action: drop
  # Holding onto pod-id and container name to
  # associate metrics with contains and cluster hierarchy
  - source_labels: [__meta_kubernetes_pod_container_name]
    target_label: "sysdig_k8s_pod_container_name"
    action: replace
```

250

230

240

CONFIGURING METRIC COLLECTION BASED ON APPLICATION INFORMATION

FIELD OF THE DISCLOSURE

The present disclosure generally relates to the technical area of clustered application monitoring. The disclosure relates more specifically to configurable monitoring of different application types.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Cloud concerns such as elastic scaling, rolling upgrades, and failover may lead to a large and fluctuating count of instances of an application. Each application instance may reside in a respective container instance in a respective virtual machine on a respective physical computer, which may cause a diversity of software release versions, filesystem paths, and available performance metrics. A multitenant cloud or a mix of applications may cause duplicate measurement and conflicting parameters of some desired performance metrics. Thus, configuration management of a telemetry gathering subsystem may be prone to various efficiency, consistency, and customization problems that are inadequately addressed by the state of the art.

A monitoring system for a cloud management platform can involve one or more agents. Each agent can collect performance metrics from applications running on a cluster node of the cloud management platform. In a conventional approach, each agent running on a cluster node may collect all performance metrics from all applications running on the cluster node, which often requires an excessive amount of computing resources. It would be helpful to better control the collection of performance metrics for each agent.

SUMMARY

The appended claims may serve as a summary of the disclosure.

BRIEF DESCRIPTION OF THE DRAWINGS

While each of the drawing figures depicts a particular embodiment for purposes of depicting a clear example, other embodiments may omit, add to, reorder, and/or modify any of the elements shown in the drawing figures. For purposes of depicting clear examples, one or more figures may be described with reference to one or more other figures, but using the particular arrangement depicted in the one or more other figures is not required in other embodiments.

In the drawings:

FIG. 2C illustrates an example merged monitoring configuration that an agent processor may generate and provide to a monitoring server.

DETAILED DESCRIPTION

Figure 1:
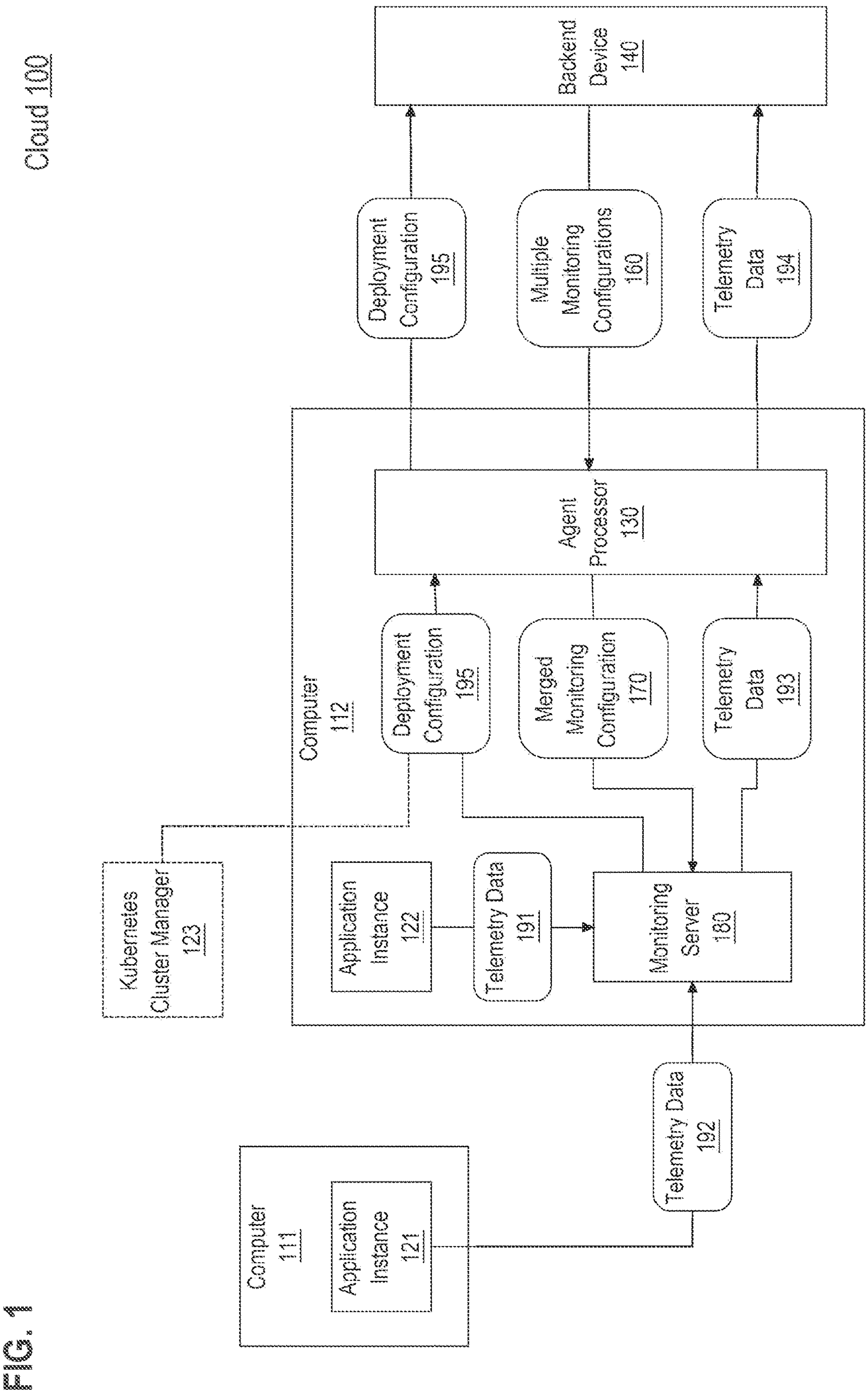
FIG. 1 illustrates an example computing architecture for monitoring an application comprising an agent processor in communication with a monitoring server and a backend device.

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure. Modifiers such as "first" and "second" may be used to differentiate elements, but the modifiers do not necessarily indicate any particular order.

Embodiments are described herein according to the following outline:

1.0 General Overview
2.0 Example Computing Architecture
3.0 Example Computer Components
3.1 Example Merged Monitoring Configuration
4.0 Example Processes
5.0 Implementation Example—Hardware Overview
6.0 Extensions and Alternatives 1.0 General Overview A monitoring system for monitoring applications or processes within containers ("container application" or "container process") and related methods are disclosed. The monitoring system is programmed or configured to execute an agent processor that provides efficiency, consistency, and customizable configuration of telemetry gathering.

In some embodiments, an agent processor performs service discovery that retrieves, from a monitoring server such as Prometheus, various deployment configuration details of potentially many instances of one or several applications, which may include information such as container names, network port numbers, and annotations indicating how an application can be monitored. Based on the discovered deployment details of the many application instances, multiple monitoring configurations are selected. Each monitoring configuration specifies which performance metrics, statistics, and status the monitoring server should collect for which application instances and how to periodically gather such telemetry.

For example, some monitoring configurations may be shared by multiple applications or application instances. Likewise, an application instance may have multiple configurations such as a default monitoring configuration, an application-wide monitoring configuration, and/or a custom override monitoring configuration for particular application instances. Thus, there need not be a one-to-one association of application instance to monitoring configuration, and two application instances might have only partial overlap of their respective sets of monitoring configurations.

One of the responsibilities of the agent processor may be to merge all relevant monitoring configurations to provide a consistent (across cluster nodes) and efficient monitoring configuration for the monitoring server to use. For example, the multiple configurations for an application instance should be merged, and the respective monitoring configurations of all application instances that the monitoring server receives telemetry from should be merged. Two monitoring configurations for a same application instance may contain discrepant settings for a same configuration detail. For example, a default monitoring configuration may specify hourly polling that may be overridden by an application-specific monitoring configuration that instead specifies polling every minute. In an embodiment, a single optimized monitoring configuration is generated for each application type. This monitoring configuration can exclude application instances that are monitored by other monitoring servers and expressly suppress unwanted metrics. Thus, the agent processor may be responsible for merging monitoring configurations.

In some embodiments, determination of which application instances should have which monitoring configurations is performed by the agent processor. The agent processor cooperates with a backend device that may have a repository of available monitoring configurations and associated deployment configuration patterns that can be used to match an application instance to an available monitoring configuration. The agent processor may use field names and field values in a deployment configuration to identify an application type and retrieve available monitoring configurations for the application type. Such pattern matching may include regular expressions, declarative rules, and/or a detection of an application or an application type. The backend device may select and send the retrieved monitoring configurations to the agent processor that may receive and merge them into an optimized monitoring configuration that the monitoring server can use for the application instance.

In some embodiments and based on the monitoring configuration, the monitoring server periodically polls application instances, container instances, virtual machines, and computers to obtain recent and fluctuating telemetry values. For example, an application instance may contain an adapter such as an exporter that provides an integration that conveys telemetry from an instance of a particular application in a format that the monitoring server accepts. The monitoring server may apply various transformations and filters to names and values in the telemetry before providing the telemetry to the agent processor. The agent processor may also apply various transformations and filters, including aggregation of telemetry from other monitoring servers or agent processors, before relaying the telemetry to the backend device. In some embodiments, the monitoring server, the agent processor, and/or the backend device may themselves be containerized and have multiple instances. For example, the backend device may be horizontally scaled to receive a high bandwidth and continuous stream of live telemetry from multiple agent processors, to persist long timeseries of many metrics values history for many application instances, and to support computationally intensive analytics, reporting, and alerting for received telemetry.

Benefits of identifying application type by the backend and merging matching monitor configurations with default monitoring configurations by the agent processor may include applying metric scraping to specific endpoints or target processes and avoiding acquiring, transferring, processing, and storing unwanted or redundant metrics. These benefits also include centralized management of reusable monitoring configurations that are consistent across multiple instances of an application and multiple nodes of a cluster. Thus, the agent processor and the backend device may individually and cooperatively conserve system resources by decreased consumption of network bandwidth, volatile memory, processor cycles, and disk space for the acquisition, transfer, persistence, and analysis of telemetry.

2.0 Example Computing Architecture

In some embodiments, software applications are deployed into managed software containers. For example, an application may be packaged as a deliverable image that may be loaded and executed in multiple instances of a software container. A software container provides a portable execution environment that may insulate an application from some aspects of a physical computer that hosts the container. Multiple instances of a same application in multiple container instances may provide horizontal scaling for throughput, elastic scaling for demand spikes, redundancy for high availability, and hardware independence for vertical scaling. A software container may be deployed within a virtual machine, a virtual operating system, or other infrastructure for managed execution of applications. Herein, an application may be referred to as a workload, a containerized application, a clustered application, or a distributed application.

In some embodiments, multiple instances of a same or different software containers are managed by a container cluster framework for remotely administering multiple instances of a same or different distributed application. In an embodiment, each instance of an application may be a point of delivery (pod) that is managed by the Kubernetes framework. A cluster-management configuration may be specified for a distributed application, and a container cluster framework may deploy and configure instances of the application according to the cluster-management configuration. The cluster-management configuration may specify details such as network port numbers, security credentials, resource allocations, filesystem paths, and a codebase. For example, a cross mounted filesystem may be shared by some or all application instances. Kubernetes accepts a cluster-management configuration for an application specified in a yet another markup language (YAML) text file.

Status, statistics, and configuration of a distributed application and of the application's container and hardware may be discovered and monitored. In various embodiments, various combinations of monitoring infrastructure that provide discovered and monitored data may include the container cluster framework, the application itself, and a dedicated monitoring server such as Prometheus. In an embodiment, the container cluster framework includes Kubernetes cluster manager 123 that may expose discoverable configuration data via a distributed data interface such as the etcd service as discussed later herein. Monitored data may include fluctuating performance metrics and configuration and topology details such as release versions, hosts, ports, container names that may be indicated through annotations. Monitored data is provided by on-demand or periodic network polling of well-known or assigned network ports and according to custom or standardized communication protocols and formats such as hypertext transfer protocol (HTTP) and JavaScript object notation (JSON). For example, a pod may receive a monitoring poll as an HTTP request on a network port. The HTTP request may or may not identify particular metrics, and the pod may reply by sending an HTTP response that contains measurement values such as formatted as name-value pairs. Such metrics may include current resource consumption such as central processing unit (CPU) cycles, volatile memory, and network bandwidth. Repeated polling of fluctuating metrics effectively provides recordable history of the configuration and performance of each pod, container, and computer. For example, one metric from one pod may be a timeseries of values, which may incur processing and storage overhead. To avoid overhead, unwanted metrics may be ignored or suppressed.

In some embodiments, instances of different clustered applications may operate as respective parts of one application. In some examples, different instances of a web server or database system are considered separate applications and correspond to different application types or equivalently workload types for containerized applications. For example, each tenant of a multitenant public cloud may be assigned separate instances of a web server to be configured to run a respective application in a respective workload. With multiple applications and workloads, customizations of monitoring may proliferate.

FIG. 1 illustrates an example computing architecture for monitoring a clustered application by using various monitoring components in communication with various sources of monitored data that characterizes the performance of the application. FIG. 1 depicts computing cloud 100 that contains many computers such as computers 111-112 that may be remotely administered through a communication network. Cloud 100 may host multiple workloads that each contain a respective containerized application. Execution environments for the applications are provided by instances of a same or different containers. For example, computers 111-112 may host respective instances of a same container. For example, a containerized application may have application instances 121-122 that are hosted on respective computers 111-112.

Administrative tasks such as scaling, health checks, and alerting, may be based on monitored data that characterizes the topology and performance of the containerized application. Due to dynamic topological adjustments such as elastic scaling, rolling upgrades, and failover, the distributed topology of any application in cloud 100 may change more or less rapidly. Thus, monitoring of a containerized application should not be based on a predefined and static topology. Instead, cloud 100 has mechanisms for dynamic discovery of application instances and their deployment configurations. In particular, monitoring is orchestrated by agent processor 130 that can obtain current cluster state data including deployment configuration 195 of an application instance by utilizing an application programming interface (API) provided by monitoring server 180 in a preferred embodiment or by Kubernetes cluster manager 123 that is drawn with a dashed outline to indicate another embodiment. Agent processor 130 may obtain deployment configuration 195 by performing service discovery as discussed later herein.

For use by monitoring server 180, agent processor 130 may generate, in various ways that depend on the embodiment, a monitoring configuration that is specialized for deployment configuration 195. In a preferred embodiment, agent processor 130 initially connects to backend device 140 and, without sending deployment configuration 195, receives, from backend device 140, a set of monitoring configuration files that are reusable for many deployment configurations. Some of the monitoring configuration files or some portions of a configuration file may or may not be relevant to deployment configuration 195, which agent processor 130 may handle such as by determining application type(s) for deployment configuration 195 as discussed later herein.

In another embodiment, agent processor 130 sends deployment configuration 195 to the backend device 140 to determine the application type, receives the monitoring configurations specific to the application type, and generates a full set of monitoring configurations that specify how to periodically gather statistics from those application instances. The agent processor 130 can obtain deployment configurations of the application instance as a result of a service discovery performed by a monitoring server 180, as further discussed below.

In an embodiment, agent processor 130 is a computer program that is hosted by computer 112. In an embodiment, agent processor 130 is itself a containerized application that may be replicated on some or all of the computers of cloud 100. On demand or periodically, agent processor 130 may discover instances of containerized applications by interrogating a container cluster framework such as Kubernetes and/or a monitoring framework such as Prometheus. This process of discovering containerized applications may herein be referred to as service discovery. In a preferred embodiment, agent processor 130 uses monitoring server 180 for service discovery. For example, agent processor 130 may cause monitoring server 180 to perform service discovery based on the set of monitoring configuration files that agent processor 130 received by initially connecting to backend device 140 as discussed above. After service discovery, agent processor 130 may adjust the monitoring configuration of monitoring server 180 to limit monitoring according to deployment configuration 195 as discussed later herein. For example, agent processor 130 may use most or all of the monitoring configurations that are initially provided by backend device 140 to generate an exploratory version of merged monitoring configuration 170 for performing service discovery with monitoring server 180. Agent processor 130 may then analyze the telemetry, metrics, and configuration data returned by service discovery to decide which subset and portions of monitoring configuration files are actually relevant to deployment configuration 195. Based on deployment configuration 195 as provided by service discovery, agent processor 130 may then regenerate a more limited (i.e. optimized) version of merged monitoring configuration 170 that contains only the subset and portions of monitoring configuration files that are actually relevant to deployment configuration 195, and this optimized merged monitoring configuration 170 can then be used to reconfigure monitoring server 180 for more efficient operation. Rules-based optimization is discussed later herein. Deployment configuration 195 and telemetry data 193 may be transferred from monitoring server 180 to agent processor 130 respectively during and after service discovery such that deployment configuration 195 and telemetry data 193 have somewhat similar format and content.

In another embodiment, the container cluster framework includes a Kubernetes control plane that contains an etcd distributed key-value store that contains discoverable Kubernetes topological and deployment details for instances of applications that are managed by Kubernetes. For example, service discovery may entail querying and retrieving deployment configuration details as name-value pairs from an etcd service. For example, agent processor 130 may retrieve some or all of deployment configuration 195 from etcd instead of from monitoring server 180. In an embodiment, an application instance is not the finest grained discoverable unit. For example, application instance 121 may contain and expose multiple services or microservices that each may have its own set of metrics. For example, there may be a containment hierarchy of application instances such that application instance 121 may be a web server instance that contains multiple web applications, some of which expose multiple services with independent lifecycles.

Computer 112 may host monitoring server 180 that agent processor 130 may interrogate to discover application instances or to discover deployment details of application instances that were discovered through a container cluster framework such as Kubernetes. For example, monitoring server 180 may be a lightweight implementation of Prometheus. In various embodiments, monitoring server 180 does or does not share a container instance or an address space with agent processor 130. For example, monitoring server 180 may be embedded within agent processor 130.

Monitoring server 180 and agent processor 130 may discover and monitor application instances that are hosted by same computer 112 that hosts monitoring server 180 and agent processor 130 or separate computer 111. For example, monitoring server 180 and agent processor 130 may discover and monitor application instances 121-122 that are hosted on respective computers 111-112 for a same or different clustered applications. For example, during service discovery, agent processor 130 may obtain deployment configuration 195 that describes application instance 121 and/or 122, including identifiers of computers 111-112, names of containers in computers 111-112, and container names and network ports that characterize application instances 121-122.

However, service discovery is not the primary function of the exporters and monitoring server 180. Monitoring by periodically gathering statistics is the primary function of monitoring server 180. Furthermore, monitoring and service discovery may be somewhat decoupled such that initially monitoring server 180 does not necessarily know which metrics are interesting and which application instances are interesting. For example, monitoring server 180 may itself be containerized such that monitoring server 180 is one of several instances of a monitoring server that are hosted on various computers in cloud 100. Although each instance of the monitoring server may monitor application instances on multiple computers, two instances of the monitoring server should not monitor a same application instance, which would impose needless overhead without providing additional measurements. Thus, for various efficiency concerns, monitoring server 180 accepts scoping limitations that prevent gathering unneeded or duplicate metrics by monitor server 180. For those reasons and after service discovery, agent processor 130 provides a monitoring configuration to monitoring server 180 that defines, expressly by name or identifier or implicitly by regular expression or other criteria that do not contain identifiers, which metrics and which application instances should be monitored by monitor server 180. An overview of monitoring configuration is as follows.

In operation, service discovery provides deployment configuration 195 that describes application instances 121-122. The following is a discussion of various embodiments and ways that agent processor 130, with or without cooperating with backend device 140, may generate merged monitoring configuration 170 for use by monitoring server 180. In a preferred embodiment and without agent processor 130 sending deployment configuration 195 to backend device 140, detection of application types and selection or exclusion of monitoring configuration files for combining into merged monitoring configuration 170 are performed solely by agent processor 130. In another embodiment, agent processor 130 instead delegates some of those responsibilities to backend device 140 by relaying deployment configuration 195 to backend device 140 for resolution. Behaviors for detection of application types and selection or exclusion of monitoring configuration files that are presented herein as being performed by backend device 140 in some embodiments are instead performed solely by agent processor 130 in a preferred embodiment.

In an embodiment, backend device 140 may contain a repository of available and reusable monitoring configurations that can be used to configure monitoring server 180 for monitoring respective applications or application instances. As discussed later herein, an embodiment of backend device 140 may analyze deployment configuration 195 to identify the application type and determine a subset of available monitoring configurations specific to the application type, shown as multiple monitoring configurations 160, that backend device 140 responsively provides to agent processor 130 for configuring monitoring server 180. In a preferred embodiment, selection of the specific subset of monitoring configurations is instead performed solely by agent processor 130.

As discussed later herein, agent processor 130 generates merged monitoring configuration 170 by merging multiple monitoring configurations 160 with default monitoring configurations and any possible custom configurations provided by a user device. The agent processor 130 may also merge monitoring configurations previously received for a first application type with monitoring configurations now received for a second application type. As discussed later herein, a user may edit any monitoring configuration file that agent processor 130 or backend device 140 contain. If a monitoring configuration file is edited in backend device 140, then backend device 140 may send the revised monitoring configuration file to agent processor 130. For example, agent processor 130 may periodically poll backend device 140 for new revisions of monitoring configuration files that agent processor 130 already has and/or uses old versions of. Receiving a new revision of a monitoring configuration file may cause agent processor 130 to redo the merging of monitoring configuration files to generate a new revision of merged monitoring configuration 170 to provide to monitoring server 180 for reconfiguration.

Monitoring server 180 is configured according to merged monitoring configuration 170 that may identify, precisely or by patterns, which metrics to collect from which application instances. A metric may have a name and a value. In an embodiment, a monitoring configuration may identify a metric by an exact name or a pattern of a name. In an embodiment, metrics may be hierarchically arranged into a sequence of levels. For example, a metric of a virtual machine may be at a higher level than a metric of an application instance in that virtual machine.

In operation and as configured, monitoring server 180 periodically polls application instances 121-122 that respectively respond by providing telemetry data 191-192 that may contain metrics and configuration details. Monitoring server 180 may combine telemetry data 191-192, including discarding unwanted or duplicate data, to generate telemetry data 193 that monitoring server 180 provides to agent processor 130. Agent processor 130 may further process telemetry data 193 to generate telemetry data 194 that agent processor 130 sends to backend device 140. In an embodiment, the agent processor 130 may transmit the telemetry data to a user interface, hosted by the same computer 112 or by another user device, such as a personal computer or smartphone, that receives telemetry data 194 and/or provides some or all of multiple monitoring configurations 160. For example, the agent processor 130 may provide interactivity and/or alerting in real time.

Either or both of monitoring server 180 and agent processor 130 may process telemetry data by discarding unneeded data, transforming raw telemetry data into derived telemetry data, and renaming metrics. For example, a name of a metric may be replaced. For example, a downstream consumer of a metric may refer to a metric by a name that the metric did not originally have when provided by an exporter. Likewise, a monitoring configuration may specify a calculation for deriving a synthetic metric as a result that is based on raw metric(s). Either or both of monitoring server 180 and agent processor 130 may receive and insert, into telemetry data 193 or 194, other telemetry data received from a remote instance of the monitoring server or the agent processor that provides telemetry data from other application instances on other computers. For example, agent processor 130 may be an instance of a containerized agent processor whose multiple instances may be topologically arranged into a hierarchy of agent processor instances that combines telemetry data from many computers and application instances in a scalable way.

3.0 Example Computer Components

Figure 2A:
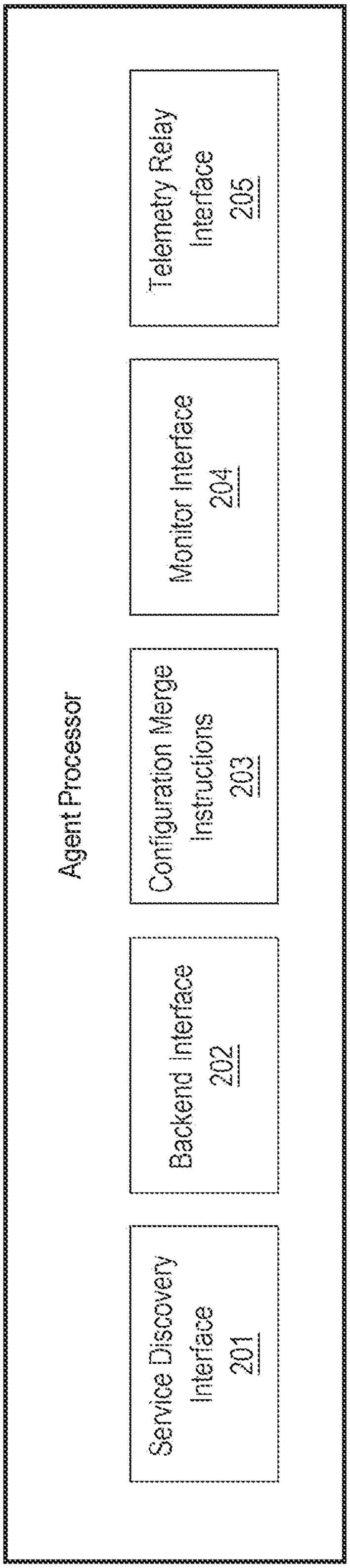
FIG. 2A illustrates example computer modules of the agent processor.
Figure 2B:
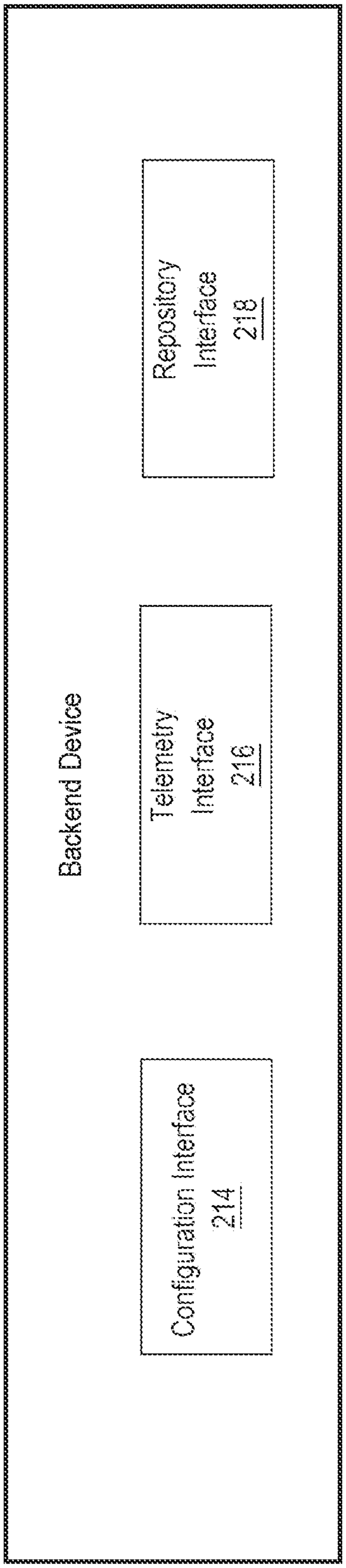
FIG. 2B illustrates example computer modules of the backend device.

FIG. 2A illustrates example computer modules of the agent processor. FIG. 2B illustrates example computer modules of the backend device. These figures are for illustration purposes only and the agent processor or the backend device can comprise fewer or more functional components. A component may or may not be self-contained. Depending upon implementation-specific or other considerations, the components may be centralized or distributed functionally or physically.

In some embodiments, the agent processor comprises service discovery interface 201, backend interface 202, configuration merge instructions 203, monitor interface 204, and telemetry relay instructions 205. From a monitoring server such as Prometheus or a container cluster framework such as Kubernetes, service discovery interface 201 retrieves deployment configuration details of application instances that may include information such as container names, network port numbers, and annotations. In an embodiment, service discovery interface 201 provides the deployment configuration details to backend interface 202 that transmits the deployment configuration details to a backend device, which may entail a network transmission such as when the backend device is remote. Backend device operation is discussed later herein for FIG. 2B.

From the backend device, backend interface 202 receives multiple monitoring configurations for application instances and provides the monitoring configurations to configuration merge instructions 203 that combines the multiple monitoring configurations into an optimized monitoring configuration as discussed later herein. Although the optimized monitoring configuration logically may be a text file, the optimized monitoring configuration may be parsed and may physically reside in the agent processor as text or a data structure in volatile memory. Configuration merge instructions 203 provides the optimized monitoring configuration to monitor interface 204 that sends the merged configuration to the monitoring server. Communication between the agent processor and the monitoring server depends on how the monitoring server is integrated with the agent processor. In various embodiments, the agent processor and monitoring server may be linked into one computer program and may share an address space, may reside in a same computer in separate programs that cooperate by inter-process communication (IPC), or may use network remoting when hosted in separate computers. From the monitoring server, telemetry relay interface 205 receives monitored data such as measurements, performs any transformations or filtration as discussed herein, and sends the monitored data to the backend device.

In some embodiments, the backend device comprises configuration interface 214, telemetry interface 216, and repository interface 218. From the agent processor, configuration interface 214 receives a deployment configuration that describes application instances, which may include container names, network port numbers, and annotations. Annotations are configuration metadata such as a label or a name/value pair that may have been added to distinguish a particular one or subset of application instances. The following behaviors for monitoring configuration management are presented as part of configuration interface 214 of the backend device. As discussed earlier herein, a preferred embodiment implements these monitoring configuration management in the agent processor instead of the backend device. Configuration interface 214 may perform pattern matching of container names, network port numbers, or annotations, based on string literals, numeric ranges, or wildcarded regular expressions, to identify an application type. As the agent processor also has the deployment configuration, the agent processor can also identify the application type. The application type is then used to select a subset of available monitoring configurations that are appropriate for the application instances. For example, the selection may generally lead to an application-wide monitoring configuration and/or a custom override monitoring configuration for particular application instances, all of which configuration interface 214 sends to the agent processor, which may entail a network transmission such as when the agent processor is remote. As discussed later herein, backend device 140 may contain a repository of reusable and combinable monitoring configurations. Repository interface 218 supports interactive or programmatic creation of new monitoring configurations and editing of existing monitoring configurations. For example, repository interface 218 may persist available monitoring configurations as respective text files in a filesystem. A new set of monitoring configurations for a new application may be created when the application is initially set up to communicate with the monitoring server. For example, such a set of scrape configs applicable to Prometheus for a new Prometheus application may be added into the repository when a new integration is being set up for the application.

In some embodiments, configuration merge instructions 203 in the agent processor may merge the multiple monitoring configurations according to a priority-based overriding. For example, each monitoring configuration may include a priority such that, when two monitoring configurations for a same application instance are being merged and contain discrepant settings for a same configuration detail, the setting in the monitoring configuration with the higher priority overrides the setting in the monitoring configuration with the lower priority. For example, a default monitoring configuration may specify hourly polling that may be overridden by an application-specific monitoring configuration that instead specifies polling every minute. In an embodiment, the agent processor may itself contain a predefined default monitoring configuration that sometimes or always is included during merging.

In some embodiments, telemetry interface 216 receives telemetry from the agent processor that contains measurements and status of application instances. For example, telemetry interface 216 may receive and persist periodic batches of recent telemetry that may contribute to growing timeseries of accumulated metrics. The backend device may provide other systems such as analytic, administrative, reporting, or health checking systems with live or historic telemetry. For example, the backend device may be a source of archived telemetry such as for data mining or trend analysis such as for capacity planning.

Although various figures herein may depict one instance of a component such as an agent processor or a monitoring server, practical topologies may contain different respective amounts of instances of each component. For example, an agent processor may configure and receive telemetry from multiple monitoring server instances; an instance of a Kubernetes cluster manager may provide service discovery to multiple agent processor instances; and a backend device may receive telemetry from multiple agent processor instances that may collectively provide a more or less continuous stream of live telemetry.

3.1 Example Merged Monitoring Configuration

FIG. 2C illustrates an example merged monitoring configuration 170 that agent processor 130 may generate and provide to monitoring server 180. In FIG. 2C, merged monitoring configuration 170 is a YAML document that contains a hierarchy of name-value pairs. Because in this example, monitoring server 180 is a so-called Prometheus scraper (Promscrape), some or all of the names in the name-value pairs shown in FIG. 2C are names that are predefined by Prometheus. The values in the name-value pairs shown in FIG. 2C may be application specific and, in some cases, are themselves names or patterns of names of metrics. For example, "source_labels: [city]" configures prom scrape to handle any metric whose name is "city" in telemetry data 191-192.

For the "city" metric in section 230, FIG. 2C specifies "action: drop" because those "city" metrics are superfluous and should be ignored by Promscrape. For example, monitoring server 180 may receive telemetry data 191 that contains the "city" metric, which monitoring server 180 detects and discards. Thus, monitoring server 180 sends telemetry data 193 that does not contain the "city" metric. In other examples, the "action" may instead specify renaming a metric or transforming the value of a metric according to a specified calculation such as a conversion from seconds to milliseconds.

For the "city" metric, FIG. 2C specifies "regex: atlantis" that cause the "action" to be selective based on the value of the metric. If the value is "atlantis", then the "action" applies and the "city" metric is discarded. If the value instead is "gotham", then the "action" does not apply and the "city" metric is copied into telemetry data 193. The "regex" may be a regular expression that matches multiple values of the metric, such as cities that begin with a particular letter or contain a particular substring. The "source_labels", "regex", and "action" name-value pairs operate together as a functional unit that is referred to herein as a rule. In an embodiment and as described elsewhere herein, rules in monitoring configuration files are evaluated by agent processor 130 or backend device 140 to facilitate any of: application type identification, selection of subsets or portions of monitoring configuration files, generation of merged monitoring configuration 170, and filtering of telemetry data 191-192. In an embodiment, when copying portions of monitoring configuration files into merged monitoring configuration 170, agent processor 130 may include or exclude name-value pairs that are parts of rules. For example, merged monitoring configuration 170 may be a promscrape configuration that should not contain rules. For example, rules may be for direct use by agent processor 130 only and not for use interpretation by monitoring server 180.

An embodiment may have a correlation between annotation names in deployment configuration 195 and metric names in telemetry data 191-192. For example, when deployment configuration 195 from Kubernetes contains an annotation with a particular name related to Prometheus monitoring in a Kubernetes configuration file, telemetry data 191 may contain a metric whose name is derived from that particular name. For example, in a Kubernetes embodiment, adding an annotation "meta_kubernetes_pod_container_name" for application instances 121-122 may cause telemetry data 191-192 to be obtained in a specific manner runtime or contain a particular metric. Thus, a monitoring configuration may contain scraping-related references such as in rules, such as "source_labels: [_meta_kubernetes_pod_container_name]" shown in the section 240, that are based on annotations in a Kubernetes configuration file to support providing data or metadata related to the application, a container in which the application runs, a cluster node that hosts the container, and so on. In an embodiment, a user is responsible for ensuring that names of metrics and annotations are properly correlated as discussed later herein.

In the example shown in FIG. 2C, merged monitoring configuration 170 has logical partitions that are listed under the shown name "scrape_configs". For example, "job_name: default" and "job_name: my-app-job" may respectively provide monitoring configuration details that are available by "default" and reusable by many applications here represented by a "default" job, or monitoring configuration details specific to a particular application such as "my-app-job". The relabel_configs: section for the default job can be expanded into the section 240, which applies to all application types.

In section 250, "my-app" may be the name of an application having application instances 121-122. The jobs listed in "scrape_configs" may each correspond to a separate monitoring configuration, and agent processor 130 may combine the separate monitoring configuration with a default monitoring configuration to generate merged monitoring configuration 170 as discussed later herein. More specifically, the agent processor may store a default set of monitoring configurations locally, receive a new set of monitoring configurations specific to a running application from the backend 140, and merge the default set of monitoring configurations with the new set of monitoring configurations. The merged set of monitoring configurations can then be used by monitoring server 180 to scrape performance metrics from the running application.

The new set of configurations can contain a configuration used to match the application type. For example, it may contain a configuration with a "regex" applicable to the name of the application or to the port number at which the application runs. The new set of monitoring configurations can contain an additional monitoring configuration used to perform further metric filtering within the application type. For example, the section 230 discussed above specifies retrieving only metrics with specific labels for my-app. In this manner, the new set of configurations can be used to scrape specific metrics from specific application (endpoints) that are running.

4.0 Example Processes

Figure 3A:
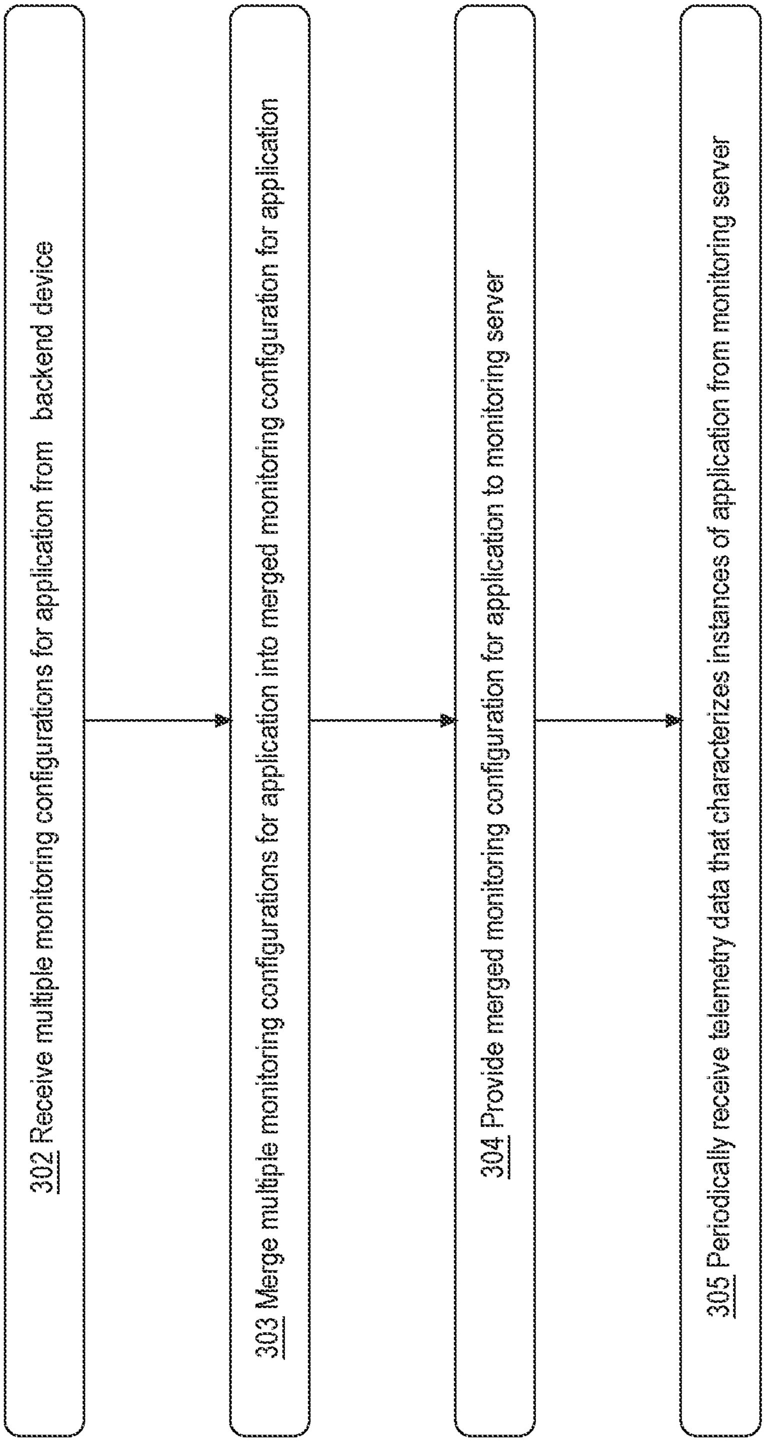
FIG. 3A illustrates an example process of monitoring container processes performed through execution of an agent processor.
Figure 3B:
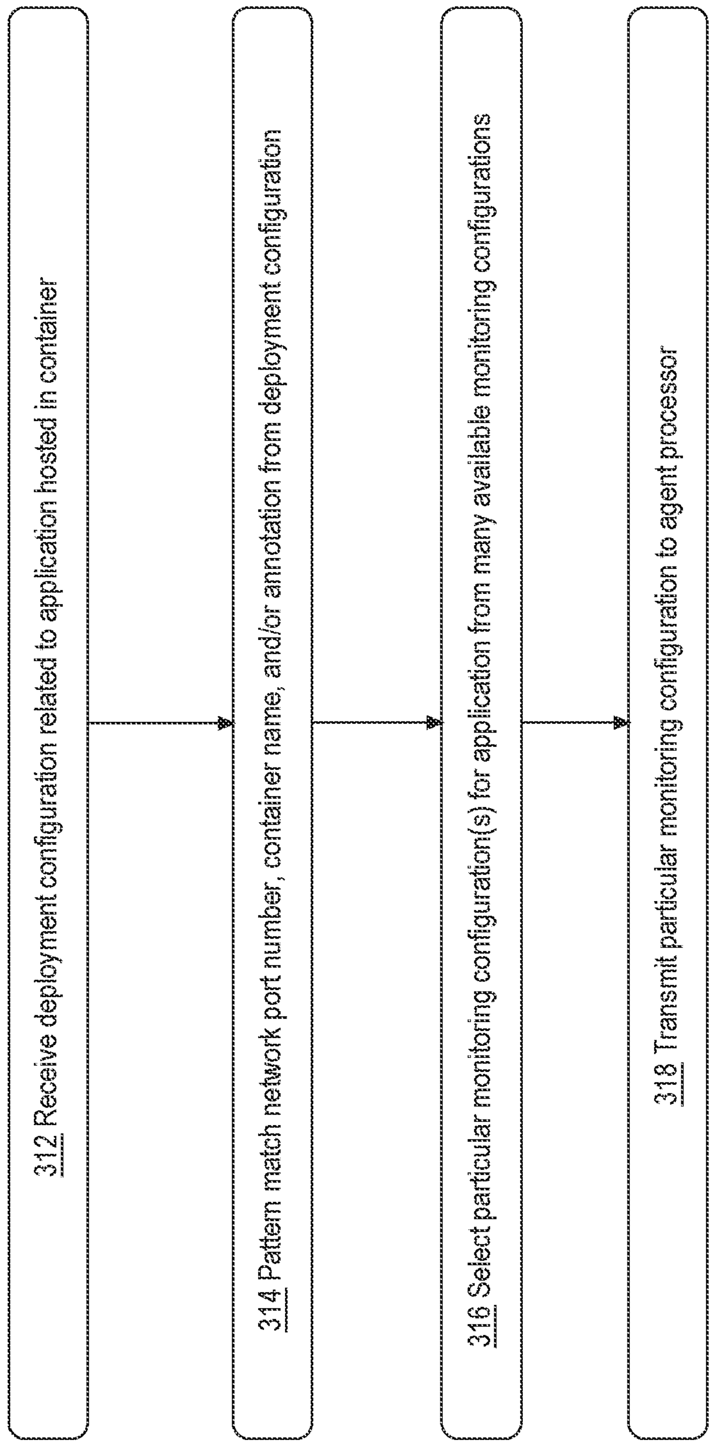
FIG. 3B illustrates an example process of selecting monitoring configurations performed through execution of a backend device.

FIG. 3A illustrates an example process of an agent processor that interoperates with a monitoring server and a backend device. FIG. 3B illustrates an example process of a backend device that interoperates with an agent processor. FIG. 3A and FIG. 3B are shown in simplified, schematic format for purposes of illustrating a clear example and other embodiments may include more, fewer, or different elements connected in various manners. Each of FIG. 3A and FIG. 3B is intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

Referring to FIG. 3A, in step 302, the agent processor is programmed or configured to receive monitoring configurations, including those specific to the application type, from the backend device. In step 303, the agent processor is programmed or configured to merge multiple monitoring configurations, including default monitoring configurations applicable to more than one application type or monitoring configurations specific to an application type, into a merged monitoring configuration for the application. In step 304, the agent processor is programmed or configured to provide the merged monitoring configuration for the application to the monitoring server. The monitoring server configures itself to monitor metrics and status of instances of the application according to the merged monitoring configuration. Monitoring by the monitoring server may entail periodically polling exporters or application instances for telemetry data such as recent measurements. In step 305, the agent processor is programmed or configured to periodically receive telemetry data that characterizes instances of the application from the monitoring server.

Referring to FIG. 3B, in step 312, an embodiment of the backend device is programmed or configured to receive deployment configuration(s) related to instances of an application hosted in instances of a container from the agent processor. In step 314, the backend device is programmed or configured to pattern match details from the deployment configurations such as a network port number, container name, and/or an annotation. In an embodiment, the backend device may have persisted many available and reusable monitoring configurations that may contain patterns such as regular expressions that can be compared in step 314 to the details from the deployment configurations for matching. In an embodiment, the patterns are instead contained in rules that the backend device uses in step 314. For example, a rule may be an association of a pattern with a particular text file that contains a monitoring configuration. In an embodiment, a rule may be an association of a pattern that corresponds to a type of workload such that that workload type is effectively detected when the pattern does match, in which case the associated monitoring configuration may be specific to that workload type.

In step 316, the backend device is programmed or configured to select particular monitoring configuration(s) for particular instances of the application from many available monitoring configurations. For example, in step 316, those monitoring configurations that matched in step 314 may be selected. For example, three application instances may match monitoring configurations A and B, and another three application instances may match monitoring configurations B and C, and thus monitoring configurations A-C are selected in step 316. In an embodiment, steps 314 and 316 are combined. In a preferred embodiment as discussed earlier herein, steps 314 and 316 are monitoring configuration management behaviors that occur in the agent processor instead of the backend device. For example, the backend device may initially send many monitoring configuration files to the agent processor, and the agent processor selects and merges subsets and portions of the monitoring configuration files, which may entail the agent processor evaluating rules that are contained in the monitoring configuration files as discussed earlier herein.

In step 318, the backend device is programmed or configured to transmit the multiple selected monitoring configurations in association with the identified application type to the agent processor. In an embodiment, each selected monitoring configuration is transmitted only once in step 318. In another embodiment, a monitoring configuration that was selected for two instances of the application is transmitted twice to the agent processor.

5.0 Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
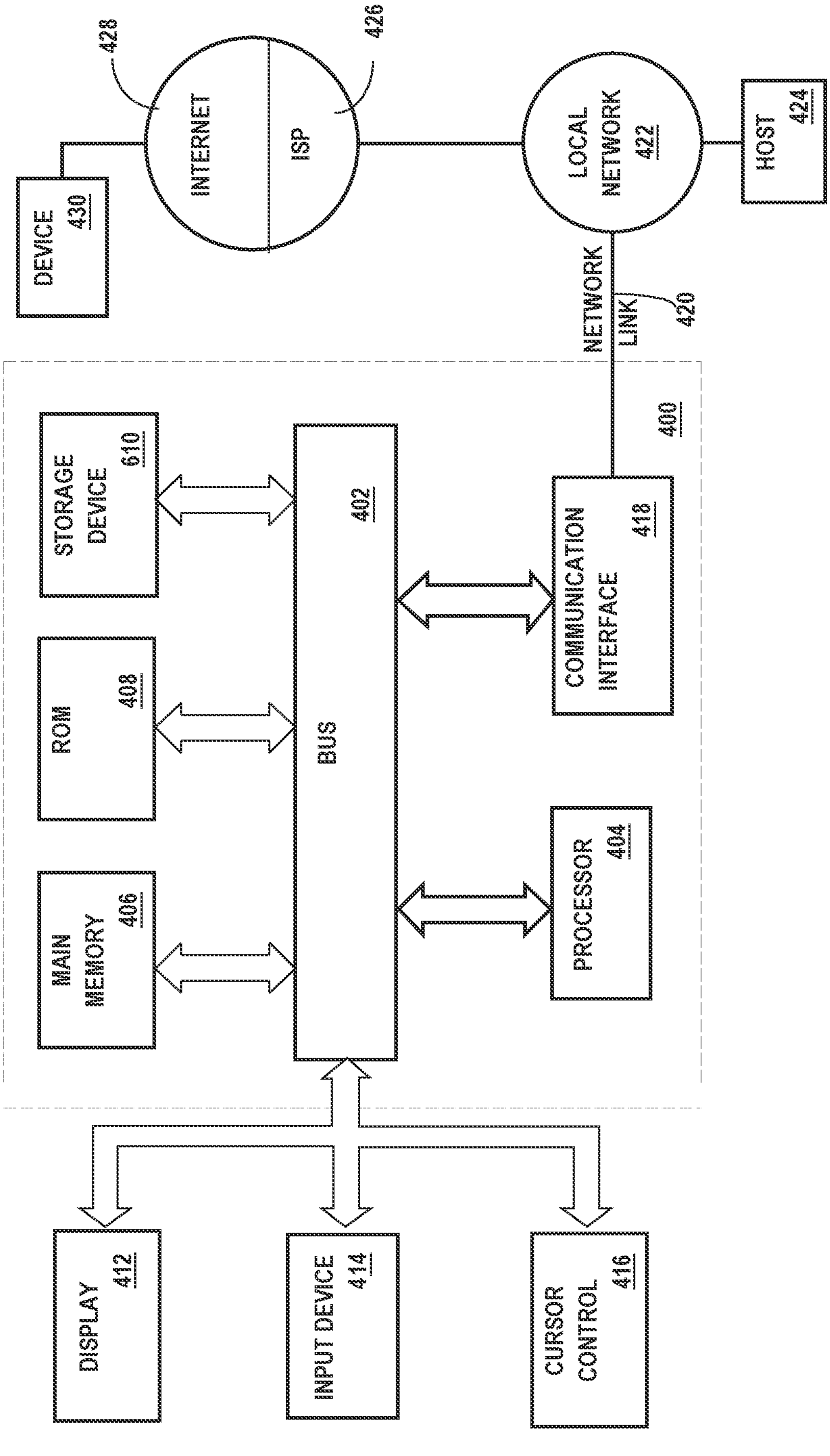
FIG. 4 depicts a computer system upon which an embodiment may be implemented.

For example, FIG. 4 is a block diagram that illustrates a computer system 400 upon which an embodiment of the disclosure may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

6.0 Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer-implemented method for monitoring a plurality of instances of an application, each of the plurality of instances of the application running in one of a plurality of containers of a computing cloud according to a deployment configuration for the application, the computer-implemented method comprising:

executing at least one of the plurality of instances of the application in at least one of the plurality of containers of the computing cloud according to the deployment configuration;

acquiring, by a first agent processor application from a backend device of the computing cloud, a plurality of monitoring configurations that specify telemetry data to collect from the plurality of instances of the application, wherein the first agent processor application executes on a first computer of the computing cloud that is separate from the backend device;

identifying, by the first agent processor application, a subset of the plurality of monitoring configurations (1) that are redundant with respect to others of the plurality of monitoring configurations or (2) that are not relevant to the deployment configuration;

creating, by the first agent processor application, a merged monitoring configuration file or data structure from the plurality of monitoring configurations, wherein the merged monitoring configuration excludes the subset;

periodically acquiring, by the first agent processor application, from a monitoring server of the computing cloud that is configured according to the merged monitoring configuration, first telemetry data for the plurality of monitoring configurations excluding the subset, which the monitoring server collects from at least some of the plurality of instances of the application; and transmitting, by the first agent processor application to the backend device, the first telemetry data to be persisted by the backend device for analysis of the application.

2. The computer-implemented method of claim 1, further comprising:

acquiring, by the first agent processor application from the monitoring server or from a cluster manager of a cluster that includes the plurality of containers, the deployment configuration.

3. The computer-implemented method of claim 1, further comprising:

acquiring, by the first agent processor application from a second agent processor application, second telemetry data, wherein the second agent processor application executes on a second computer of the computing cloud that is separate from the first computer and the backend device, the first telemetry data being collected from instances of the application executing on the first computer, and the second telemetry data being collected from instances of the application executing on the second computer; and transmitting, by the first agent processor application to the backend device, the second telemetry data to be persisted by the backend device for analysis of the application.

4. The computer-implemented method of claim 1, wherein the plurality of monitoring configurations includes monitoring configurations corresponding to a first application type and monitoring configurations corresponding to a second application type, the computer-implemented method further comprising:

excluding, by the first agent processor application in the merged monitoring configuration, the monitoring configurations corresponding to the second application type.

5. The computer-implemented method of claim 1, further comprising:

specifying, by the first agent processor application in the merged monitoring configuration, not to collect telemetry data for a particular metric for the application that is to be ignored.

6. The computer-implemented method of claim 1, further comprising:

including, by the first agent processor application in the merged monitoring configuration, a regular expression that matches values for some telemetry data collected by the monitoring server from the at least some of the plurality of instances of the application, the acquiring of the first telemetry data being based at least in part on the matching of the regular expression.

7. The computer-implemented method of claim 1, further comprising:

replacing, by the first agent processor application, a first name of a metric of the first telemetry data with a second name different from the first name, wherein the first telemetry data associates the first name with the metric when collected by the monitoring server from the at least some of the plurality of instances of the application, and the first telemetry data associates the second name with the metric when transmitted by the first agent processor application to the backend device.

8. The computer-implemented method of claim 1, further comprising:

specifying, by the first agent processor application in the merged monitoring configuration, a calculation to perform with respect to a metric to be collected by the monitoring server, the first telemetry data containing a result of performing the calculation.

9. A non-transitory computer-readable storage medium storing instructions which, when executed by a first computer of a computing cloud, cause a first agent processor application executing on the first computer to carry out a method of monitoring a plurality of instances of an application, each of the plurality of instances of the application running in one of a plurality of containers of the computing cloud according to a deployment configuration for the application, wherein the method comprises:

executing at least one of the plurality of instances of the application in at least one of the plurality of containers of the computing cloud according to the deployment configuration;

acquiring, from a backend device of the computing cloud that is separate from the first computer, a plurality of monitoring configurations that specify telemetry data to collect from the plurality of instances of the application;

identifying a subset of the plurality of monitoring configurations (1) that are redundant with respect to others of the plurality of monitoring configurations or (2) that are not relevant to the deployment configuration;

creating a merged monitoring configuration file or data structure from the plurality of monitoring configurations, the merged monitoring configuration excluding the subset;

periodically acquiring, from a monitoring server of the computing cloud that is configured according to the merged monitoring configuration, first telemetry data for the plurality of monitoring configurations excluding the subset, which the monitoring server collects from at least some of the plurality of instances of the application; and transmitting, to the backend device, the first telemetry data to be persisted by the backend device for analysis of the application.

10. The non-transitory computer-readable storage medium of claim 9, wherein the method further comprises:

acquiring the deployment configuration from the monitoring server or from a cluster manager of a cluster that includes the plurality of containers.

11. The non-transitory computer-readable storage medium of claim 9, wherein the method further comprises:

acquiring, from a second agent processor application, second telemetry data, the second agent processor application executing on a second computer of the computing cloud that is separate from the first computer and the backend device, the first telemetry data being collected from instances of the application executing on the first computer, and the second telemetry data being collected from instances of the application executing on the second computer; and transmitting, to the backend device, the second telemetry data to be persisted by the backend device for analysis of the application.

12. The non-transitory computer-readable storage medium of claim 9, wherein the plurality of monitoring configurations includes monitoring configurations corresponding to a first application type and monitoring configurations corresponding to a second application type, wherein the method further comprises:

excluding, in the merged monitoring configuration, the monitoring configurations corresponding to the second application type.

13. The non-transitory computer-readable storage medium of claim 9, wherein the method further comprises:

specifying, in the merged monitoring configuration, not to collect telemetry data for a particular metric for the application that is to be ignored.

14. The non-transitory computer-readable storage medium of claim 9, wherein the method further comprises:

including, in the merged monitoring configuration, a regular expression that matches values for some telemetry data collected by the monitoring server from the at least some of the plurality of instances of the application, the acquiring of the first telemetry data being based at least in part on the matching of the regular expression.

15. The non-transitory computer-readable storage medium of claim 9, wherein the method further comprises:

replacing a first name of a metric of the first telemetry data with a second name different from the first name, the first telemetry data associating the first name with the metric when collected by the monitoring server from the at least some of the plurality of instances of the application, and the first telemetry data associating the second name with the metric when transmitted by the first agent processor application to the backend device.

16. The non-transitory computer-readable storage medium of claim 9, wherein the method further comprises:

specifying, in the merged monitoring configuration, a calculation to perform with respect to a metric to be collected by the monitoring server, the first telemetry data containing a result of performing the calculation.

17. A computer including a processor and memory, wherein the processor executes instructions stored in the memory to monitor a plurality of instances of an application, each of the plurality of instances of the application running in one of a plurality of containers of a computing cloud according to a deployment configuration for the application, by performing the following steps:

executing at least one of the plurality of instances of the application in at least one of the plurality of containers of the computing cloud according to the deployment configuration;

acquiring, by a first agent processor application from a backend device of the computing cloud that is separate from the computer, a plurality of monitoring configurations that specify telemetry data to collect from the plurality of instances of the application, the first agent processor application executing on the computer;

identifying, by the first agent processor application, a subset of the plurality of monitoring configurations (1) that are redundant with respect to others of the plurality of monitoring configurations or (2) that are not relevant to the deployment configuration;

creating, by the first agent processor application, a merged monitoring configuration file or data structure from the plurality of monitoring configurations, the merged monitoring configuration excluding the subset;

periodically acquiring, by the first agent processor application from a monitoring server of the computing cloud that is configured according to the merged monitoring configuration, first telemetry data for the plurality of monitoring configurations excluding the subset, which the monitoring server collects from at least some of the plurality of instances of the application; and transmitting, by the first agent processor application to the backend device, the first telemetry data to be persisted by the backend device for analysis of the application.

18. The computer of claim 17, wherein the steps further include:

acquiring, by the first agent processor application from the monitoring server or from a cluster manager of a cluster that includes the plurality of containers, the deployment configuration.

19. The computer of claim 17, wherein the steps further include:

acquiring, by the first agent processor application from a second agent processor application, second telemetry data, the second agent processor application executing on another computer of the computing cloud that is separate from the computer and the backend device, the first telemetry data being collected from instances of the application executing on the computer, and the second telemetry data being collected from instances of the application executing on the other computer; and transmitting, by the first agent processor application to the backend device, the second telemetry data to be persisted by the backend device for analysis of the application.

20. The computer of claim 17, wherein the plurality of monitoring configurations includes monitoring configurations corresponding to a first application type and monitoring configurations corresponding to a second application type, and wherein the steps further include:

excluding, by the first agent processor application in the merged monitoring configuration, the monitoring configurations corresponding to the second application type.

* * * * *